United States Patent

Nezu (10) Patent No.: US 8,422,814 B2
(45) Date of Patent: Apr. 16, 2013

(54) APPARATUS AND METHOD FOR GEOMETRIC DISTORTION CORRECTION IN VIDEO SIGNALS

(75) Inventor: Eifu Nezu, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 930 days.

(21) Appl. No.: 12/312,189

(22) PCT Filed: Jan. 25, 2008

(86) PCT No.: PCT/JP2008/051597
§ 371 (c)(1),
(2), (4) Date: Apr. 29, 2009

(87) PCT Pub. No.: WO2008/091024
PCT Pub. Date: Jul. 31, 2008

(65) Prior Publication Data
US 2009/0279806 A1  Nov. 12, 2009

(30) Foreign Application Priority Data

Jan. 26, 2007  (JP) ................................. 2007-016382

(51) Int. Cl.
*G06K 9/40* (2006.01)

(52) U.S. Cl.
USPC ........... 382/265; 382/261; 382/263; 348/625; 348/666

(58) Field of Classification Search ............ 382/261, 382/263–265
See application file for complete search history.

(56) References Cited

U.S. PATENT DOCUMENTS

| 4,302,777 | A | * | 11/1981 | Kemner et al. | 348/688 |
| 4,454,533 | A | * | 6/1984 | Lagoni | 348/627 |
| 4,510,521 | A | * | 4/1985 | Ruprecht et al. | 348/646 |
| 4,549,213 | A | * | 10/1985 | Illetschko | 348/620 |
| 5,155,586 | A | * | 10/1992 | Levy et al. | 348/104 |

(Continued)

FOREIGN PATENT DOCUMENTS

| JP | 59127480 A | * | 7/1984 |
| JP | 61-184059 | | 8/1986 |

(Continued)

OTHER PUBLICATIONS

Eifu, et al., "Method and Device for Improving Image Quality", 2006, English Translation, p. 1-11.*

*Primary Examiner* — Claire X Wang
*Assistant Examiner* — Gandhi Thirugnanam
(74) *Attorney, Agent, or Firm* — McGinn IP Law Group, PLLC (57) ABSTRACT

Unnecessary flare correction at the boundary between a blanking area and video signal area is suppressed. An image quality improving apparatus includes 2-dimensional low-pass filter circuit 2 that extracts low-frequency components from an input video signal; subtractor circuit 4 that obtains high-frequency components by subtracting the low-frequency components extracted by 2-dimensional low-pass filter circuit 2 from the input video signal; and adder circuit 6 that adds the high-frequency components obtained by subtractor circuit 4 as a correction signal to the input video signal. The input video signal contains blanking signals without any video information. 2-dimensional low-pass filter circuit 2 starts extraction of the low-frequency components after a lapse of a predetermined unit time from when the input video signal changed from the blanking signal to the signal that contains the video information.

14 Claims, 7 Drawing Sheets

U.S. PATENT DOCUMENTS

| | | | |
|---|---|---|---|
| 5,221,963 A * | 6/1993 | Hashimoto et al. | 348/234 |
| 5,278,653 A * | 1/1994 | Mead | 348/607 |
| 6,081,302 A * | 6/2000 | Hanai | 348/630 |
| 6,381,287 B1 * | 4/2002 | Shin | 375/316 |
| 6,683,645 B1 * | 1/2004 | Collins et al. | 348/294 |
| 7,006,704 B2 * | 2/2006 | Kobayashi et al. | 382/264 |
| 7,106,386 B2 * | 9/2006 | Kobayashi | 348/625 |
| 7,557,834 B2 * | 7/2009 | Kaneko et al. | 348/222.1 |
| 7,602,447 B2 * | 10/2009 | Arici et al. | 348/687 |
| 2002/0149685 A1 * | 10/2002 | Kobayashi et al. | 348/252 |
| 2003/0020836 A1 * | 1/2003 | Kobayashi | 348/625 |
| 2004/0061790 A1 * | 4/2004 | Tanji et al. | 348/222.1 |
| 2004/0119858 A1 * | 6/2004 | Shimazaki | 348/252 |
| 2005/0046701 A1 * | 3/2005 | Kaneko et al. | 348/222.1 |
| 2006/0013507 A1 * | 1/2006 | Kaneko et al. | 382/312 |
| 2006/0098122 A1 * | 5/2006 | Kobayashi et al. | 348/571 |
| 2006/0103763 A1 * | 5/2006 | Kobayashi et al. | 348/625 |
| 2009/0279806 A1 * | 11/2009 | Nezu | 382/264 |
| 2009/0303337 A1 * | 12/2009 | Kaneko et al. | 348/222.1 |

FOREIGN PATENT DOCUMENTS

| | | |
|---|---|---|
| JP | 2000-295146 | 10/2000 |
| JP | 2000-331151 | 11/2000 |
| JP | 2002-290772 | 10/2002 |
| JP | 2005-266042 | 9/2005 |
| JP | 2006-157228 | 6/2006 |

* cited by examiner

PRIOR ART

APPARATUS AND METHOD FOR GEOMETRIC DISTORTION CORRECTION IN VIDEO SIGNALS

TECHNICAL FIELD

The present invention relates to an apparatus for improving image quality in an image display device represented by a video projector.

BACKGROUND ART

It has been known that in image display devices such as television receivers, video projectors and the like, the quality of an image is degraded by the occurrence of flares. A flare refers to a blurring phenomenon which is caused at edge portions (e.g., a border between white and black areas) where there is a large difference in brightness in the displayed image, by light from a bright area leaking into an dark area due to reflection and/or the scattering of light through the lenses and illuminated surfaces of a projection tube or an image-receiving tube (see paragraphs [0002] to [0005] and FIG. 17 in Japanese Patent Application Laid-open 2002-290772).

Figure 1:
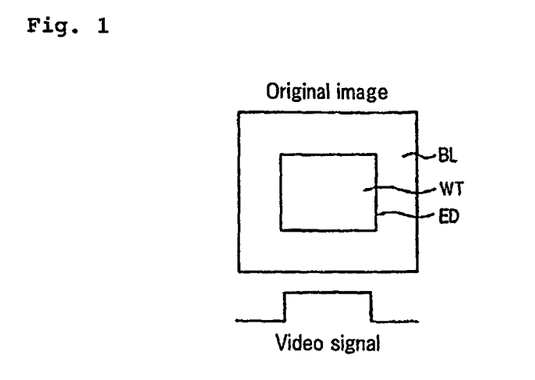
FIG. 1 is a schematic diagram showing an example of an original image of the picture to be projected by a projector.

FIG. 1 is a schematic diagram showing one example of an original image of a picture to be projected by a projector. This original image has rectangular white area WT in the center and black area BL around white area WT with their boundary or edge portion ED having a large difference in brightness. Shown at the bottom in FIG. 1 is a video signal (luminance signal) in the horizontal direction around the center of the original image. When this original image is projected on a screen by a projector, light in white area WT leaks into black area BL so that blurring appears at edge portion ED. This blurring is the flare which degrades image quality.

Figure 2:
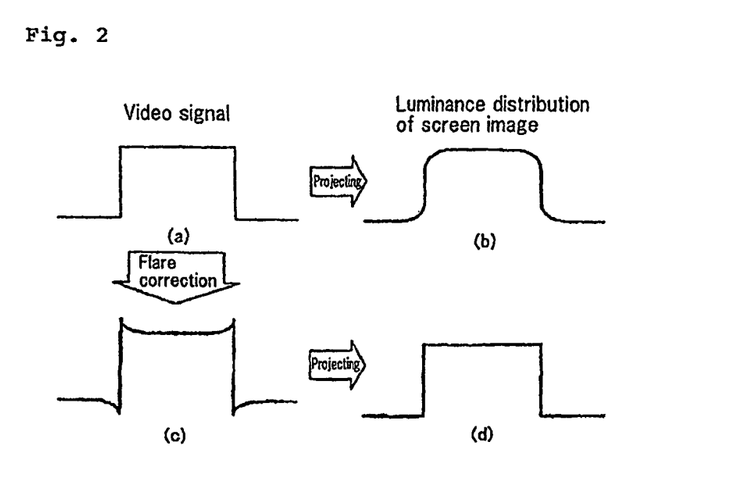
FIG. 2 is a conceptual diagram showing flare correction.

In order to eliminate such flares as above, it is a common practice to perform digital signal processing for correcting the blurs at the edges of video signals to be input to the projector. FIG. 2 is a conceptual diagram of a flare correction. In FIG. 2, sub FIG. 2(a) is a waveform chart showing a video signal of an original image; sub FIG. 2(b) is a luminance distribution chart of a screen image that is displayed based on the video signal of sub FIG. 2(a); sub FIG. 2(c) is a waveform chart of a signal that is obtained from the video signal of sub FIG. 2(a) after flare correction; and sub FIG. 2(d) is a luminance distribution chart of a screen image that is displayed based on the video signal after flare correction shown in sub FIG. 2(c). Here, the video signal of sub FIG. 2(a) corresponds to the video signal of the original image shown in FIG. 1.

The screen image projected based on the video signal of sub FIG. 2(a) by a projector forms an image with its edge portions rounded as shown in sub FIG. 2(b) due to the occurrence of flare. In order to compensate for flare in this image, the leading and trailing edges of the video signal in sub FIG. 2(a) need to be corrected (conversely corrected) in accordance with the deformation of the edge portions shown in sub FIG. 2(b) or by making a correction so as to make the edges distinctive. With this correction, as shown in sub FIG. 2(b), a screen image without edge portions rounded can be obtained.

Figure 3:
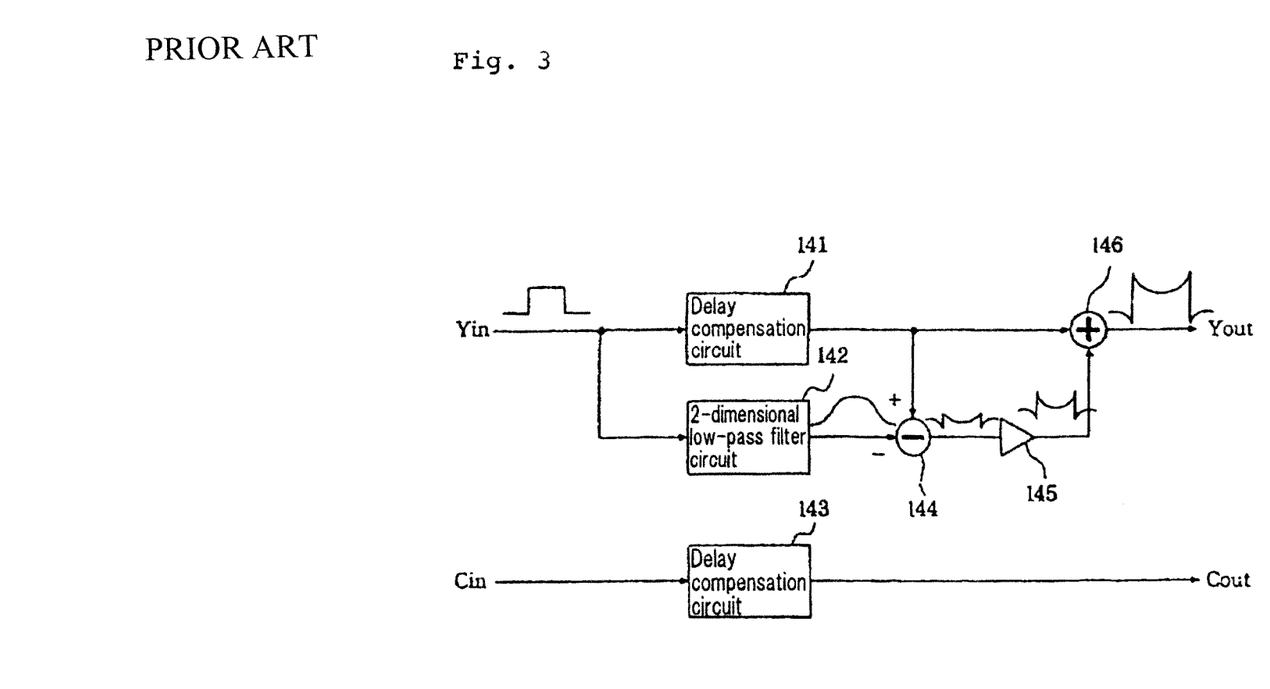
FIG. 3 is a block diagram showing an example of an image quality improving apparatus capable of making flare correction.

As an apparatus capable of making flare correction as above, there is an image quality improving apparatus as described in Japanese Patent Application Laid-open 2006-157228 (see FIG. 4). FIG. 3 shows a configuration of the image quality improving apparatus.

Referring to FIG. 3, the image quality improving apparatus includes delay compensation circuit 141, 2-dimensional low-pass filter (LPF) circuit 142, delay compensation circuit 143, subtractor circuit 144, amplifier circuit 145 and adder circuit 146. A luminance (Y) signal is supplied to delay compensation circuit 141 and 2-dimensional LPF circuit 142 while a chromaticity (C) signal is supplied to delay compensation circuit 143.

Delay compensation circuit 141 delays the input Y signal by the amount of time required for the process in 2-dimensional LPF circuit 142. The output from delay compensation circuit 141 is supplied to one input terminal of subtractor circuit 144 and to one input terminal of adder circuit 146. Two-dimensional LPF circuit 142 is a filter for removing high-frequency components (edge components) of the input Y-signal, and its output is supplied to the other input terminal of subtractor circuit 144. The output from 2-dimensional LPF circuit 142 presents the Y-signal with its edge portions rounded.

Subtractor circuit 144 subtracts the Y-signal supplied from 2-dimensional LPF circuit 142 from the Y-signal supplied from delay compensation circuit 141. The output from subtractor circuit 144 presents a signal of high-frequency components (edge components) that were extracted from the Y-signal. The edge component signal output from subtractor circuit 144 is supplied to the other input terminal of adder circuit 146 via amplifier circuit 145. Amplifier circuit 145 amplifies the edge component signal supplied from subtractor circuit 144. Adder circuit 146 adds the edge component signal that was amplified by amplifier circuit 145 to the Y-signal supplied from delay compensation circuit 141. The output from adder circuit 146 presents a signal that is obtained by emphasizing the input Y-signal at its edges and that corresponds to the signal shown in sub FIG. 2(c).

In the above image quality improving apparatus, 2-dimensional LPF circuit 142 can be constructed of a recursive filter (see Japanese Patent Application Laid-open 2006-157228 and FIG. 1 in Japanese Patent Application Laid-open S61-184059). In this case, in order to improve the accuracy of the 2-dimensional LPF, a time axis inverting process (field inverting process) is often used.

Further, recent image display devices are adapted to be able to perform a displaying process that supports a plurality of video signals having images different image sizes (the aspect ratio or resolution) that are to be displayed. In such an image display device, it is not preferable that flare correction processing circuits be provided in correspondence with input image signals whose image sizes that are to be displayed are different because this entails enlargement of the circuit scale. According to the apparatus in which the flare correcting process is effected after a process for modifying the input video signal so as to modify the size of the displayed image to a fixed image size that is designated for the display device, it is possible for a single flare correcting circuit to support input video signals of different image sizes, and the circuit configuration can also be made simple.

Further, in an image display apparatus such as a projector, the shape of the projected image deforms depending on the angle at which the image is projected. To deal with this, there is also a proposal of an apparatus which makes correction of geometric distortion such as trapezoidal correction to the video signal by modifying the shape of the displayed image against the deformation of the projected image (see Japanese Patent Application Laid-open 2005-266042).

DISCLOSURE OF THE INVENTION

In the above-described image quality improving apparatus, there occurs the following problem when it is applied to an image display device that makes geometric distortion correction to video signals.

In a video signal, for example, the field (or frame) display period is regulated by the vertical synchronization signal while the horizontal synchronization signal regulates the timing at which the horizontal scan line is changed over. Before and after the horizontal synchronization signal, the video signal includes the blanking signal that does not contain any video information. When no geometrical distortion correction is effected, a video frame is displayed on the display device based on the video signal containing video information while the part that is not displayed on the screen is assumed to be the blanking duration (corresponding to the blanking signals). When the video signal has not been subjected to geometrical distortion correction, the area (video signal area) that is displayed based on the video signal takes a rectangular form (see FIG. 1). However, when the video signal has been subjected to geometrical distortion correction, the video signal area does not take a rectangular form.

Figure 4:
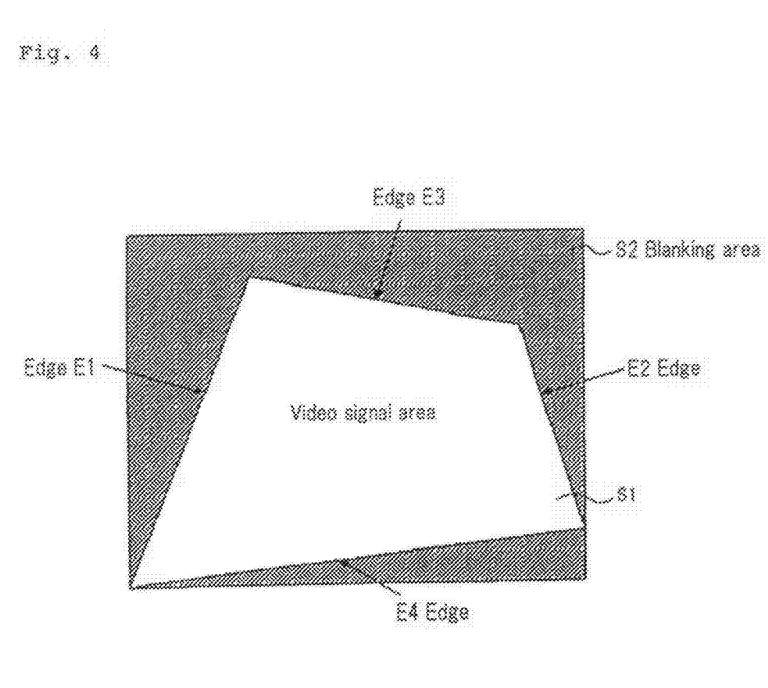
FIG. 4 is a schematic diagram showing an example of an image to be formed on a display device in accordance with a video signal which has been subjected to geometric distortion correction.

FIG. 4 is a schematic diagram of an image that is formed on a display device based on the video signal that has been subjected to geometric distortion correction. When the video signal has been subjected to geometric distortion correction, video signal area S1 has a shape dissimilar from the rectangular shape as shown in FIG. 4. Edges E1 to E4 corresponding to the sides of video signal area S1 form the boundary between video signal area S1 and blanking area S2. The area outside video signal area S1, or blanking area S2 has a signal level corresponding to the black level (the level representing black on the display screen, e.g., '0' level).

In the flare correction, as shown in sub FIG. 2(b), the edges and their adjacent areas are corrected so as to make the edges distinctive. If this flare correction is effected to the video signal that has been subjected to the geometric distortion correction shown in FIG. 4, in edge E1 for example, a correction is carried out so as to make edge E1 and its adjoining area distinctive. In this case, an unnecessary flare correction effect is given to the area along edge E1 inside video signal area S1, resultantly, the quality of the displayed image degrades. This degradation of image quality due to such flare correction prominently appears in an apparatus which uses a field inversion process.

An exemplary object of the present invention is to solve the above problem and to provide an image quality improving apparatus and image quality improving method, which can provide high-quality video by suppressing unnecessary flare correction at the boundary between the blanking area and video signal area.

In order to achieve the above exemplary object, an image quality improving apparatus of the present invention includes: a low-pass filter circuit that extracts low-frequency components from an input video signal; a subtractor circuit that subtracts the low-frequency components extracted by said low-pass filter circuit from said input video signal to obtain high-frequency components; and an adder circuit that adds the high-frequency components obtained by said subtractor circuit as a correcting signal to said input video signal, wherein said input video signal includes blanking signals that do not contain any video information; and said low-pass filter circuit starts extracting said low-frequency components after a lapse of a predetermined unit time from when said input video signal changed from said blanking signal to the signal having said video information.

Also, an image quality improving method of the present invention includes: extracting low-frequency components from an input video signal; obtaining high-frequency components by subtracting the low-frequency components extracted by said first step from said input video signal; and adding the high-frequency components obtained at said second step as a correcting signal to said input video signal, and wherein said input video signal contains blanking signals without any video information, and extraction of said low-frequency components is started after a lapse of a predetermined unit time from when said input video signal changed from said blanking signal to the signal containing said video information.

The above and other exemplary purposes, features, and advantages of the present invention will become apparent from the following description with reference to the accompanying drawings which illustrate examples of the present invention.

BEST MODE FOR CARRYING OUT THE INVENTION

Figure 5:
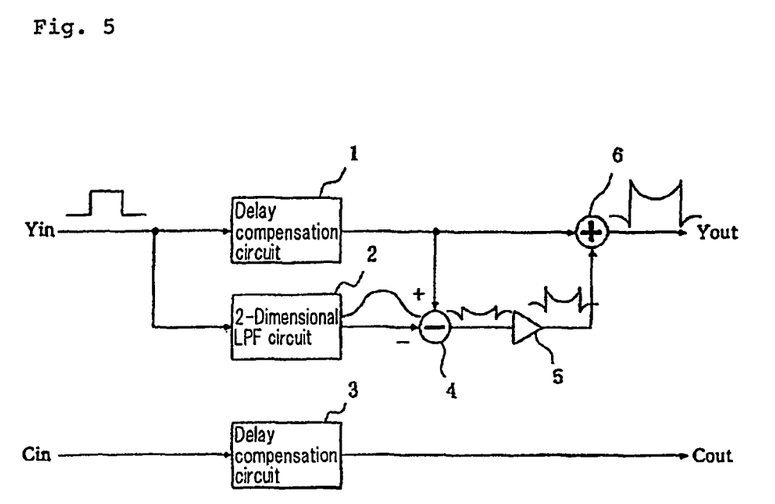
FIG. 5 is a block diagram showing a configuration of an image quality improving apparatus as an exemplary embodiment of the present invention.

FIG. 5 is a block diagram showing a configuration of an image quality improving apparatus as an exemplary embodiment of the present invention. Referring to FIG. 5, the image quality improving apparatus of the present embodiment includes delay compensation circuit 1, 2-dimensional low-pass filter (LPF) circuit 2, delay compensation circuit 3, subtractor circuit 4, amplifier circuit 5 and adder circuit 6. The luminance (Y) signal is input to delay compensation circuit 1 and 2-dimensional LPF circuit 2 while the chromaticity (C) signal is supplied to delay compensation circuit 3. The configuration other than 2-dimensional LPF circuit 2 is the same as the image quality improving apparatus shown in FIG. 3.

Figure 6:
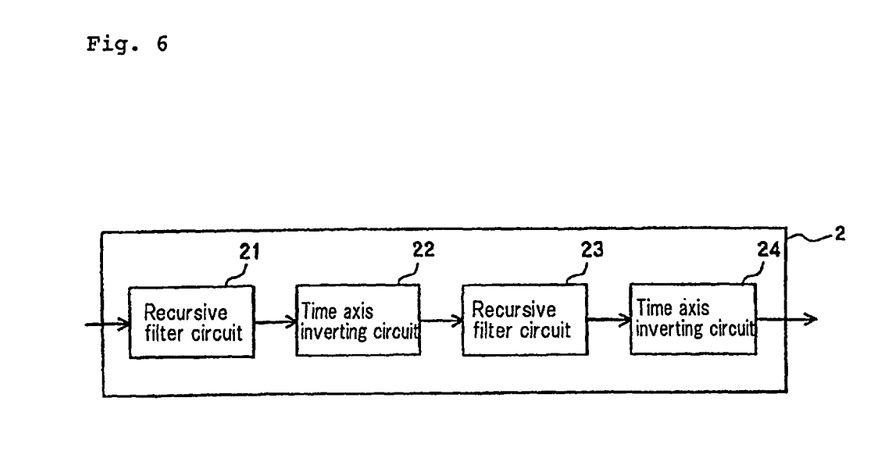
FIG. 6 is a block diagram showing an example of a 2-dimensional LPF circuit shown in FIG. 5.

Shown in FIG. 6 is a configurational example of 2-dimensional LPF circuit 2. Referring to FIG. 6, 2-dimensional LPF circuit 2 includes recursive filter 21 to which the input Y-signal is supplied, time axis inverting circuit 22 receiving the output from recursive filter circuit 21, recursive filter circuit 23 receiving the output from time axis inverting circuit 22 and time axis inverting circuit 24 receiving the output from recursive filter circuit 23.

Figure 7:
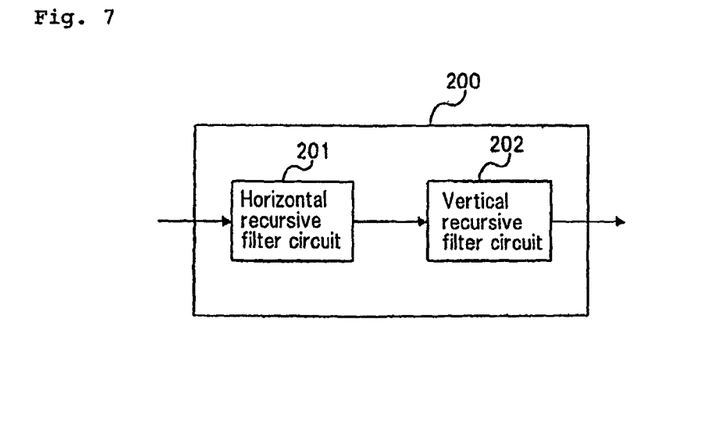
FIG. 7 is a block diagram showing an example of a recursive filter circuit shown in FIG. 6.

Recursive filter circuits 21 and 23 have the same configurations. FIG. 7 shows a recursive filter circuit configuration that is applied to recursive filter circuits 21 and 23. Referring to FIG. 7, recursive filter circuit 200 is a circuit made up of horizontal recursive filter circuit 201 that performs a filtering process to remove high-frequency components (edge components) with respect to the horizontal direction of the video signal and vertical recursive filter circuit 202 that performs a filtering process to remove high-frequency components (edge components) with respect to the vertical direction of the video signal, the two being connected in series. In the example shown in FIG. 7, the output from horizontal recursive filter circuit 201 is supplied to the input terminal of vertical recursive filter circuit 202. However, in contrast to this connection the output from vertical recursive filter circuit 202 may be supplied to the input terminal of horizontal recursive filter circuit 201. That is, the connecting order of horizontal recursive filter circuit 201 and vertical recursive filter circuit 202 is not particularly limited.

Horizontal recursive filter circuit 201 and vertical recursive filter circuit 202 are constructed so as to start their recursive filtering functions only after a lapse of a predetermined unit time from when the input signal has changed for the first time from the blanking signal (black level signal) toward white levels. The unit time in horizontal recursive filter circuit 201 is one-pixel period, whereas the unit time in vertical recursive filter circuit 202 is one horizontal period.

Figure 8:
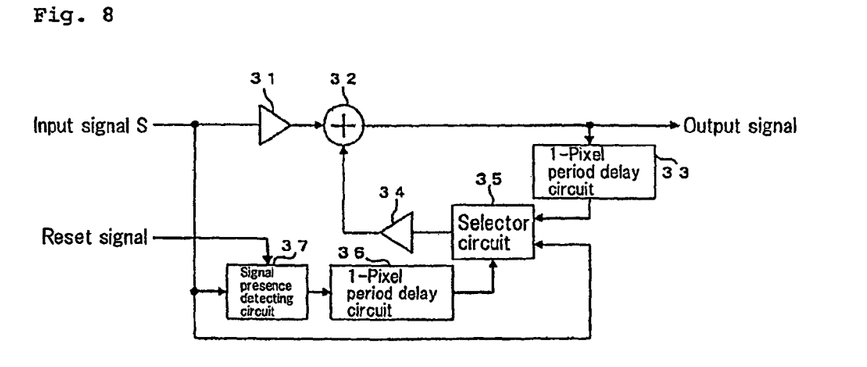
FIG. 8 is a block diagram showing an example of a horizontal recursive filter circuit shown in FIG. 7.

Shown in FIG. 8 is a configuration of horizontal recursive filter circuit 201. Referring to FIG. 8, horizontal recursive filter circuit 201 includes amplifiers 31 and 34, adder 32, one-pixel period delay circuits 33 and 36, selector circuit 35 and signal presence detecting circuit 37. Input signal S is supplied to one input terminal of selector circuit 35 and is also supplied to the other input terminal of selector 35 by way of amplifier 31, adder 32 and one-pixel period delay circuit 33. Input signal S is also supplied to signal presence detecting circuit 37.

Amplifier 31 amplifies input signal S. Supplied to one input terminal of adder 32 is the output from amplifier 31, the other input terminal being supplied with the output from amplifier 34. Adder 32 adds the output from amplifier 34 to the output from amplifier 31. Amplifier 34 amplifies the output from selector circuit 35. One-pixel period delay circuit 33 delays the output from adder 32 by the amount of time corresponding to one pixel period. These components, or amplifier 31, adder 32, one-pixel period delay circuit 33 and amplifier 34 constitute a recursive filter.

Signal presence detecting circuit 37 detects, for every horizontal period of input signal S, the timing at which the video signal having other than the black level is input for the first time from the start of the horizontal period, or the timing at which the level of input signal S changes from the blanking signal level (black level) toward white levels for the first time. Signal presence detecting circuit 37 outputs a control signal of the first level in the duration from the start of the horizontal period to the first change from the black level toward white levels, and outputs a control signal of the second level that is different from the first level after the first change from the black level toward white levels is detected. The signal that regulates the start of the horizontal period is called a reset signal. The horizontal synchronization signal is used as the reset signal. Signal presence detecting circuit 37 holds the control signal at the first level when it receives a reset signal. The control signal output from signal presence detecting circuit 37 is supplied to selector circuit 35 by way of one-pixel period delay circuit 36.

One-pixel period delay circuit 36 delays the control signal supplied from signal presence detecting circuit 37 by the amount of time corresponding to one pixel period. This delay time given by one-pixel period delay circuit 36 is equal to the delay time given by one-pixel period delay circuit 33.

Selector circuit 35 selects input signal S that is supplied to its one input terminal while the input control signal is at the first level. In this case, no removal of high-frequency components (edge components) by the recursive filter is performed. As a result, input signal S is output, as it is, from horizontal recursive filter circuit 201. On the other hand, selector circuit 35 selects the output from one-pixel period delay circuit 33 while the input control signal is being at the second level. In this case, the high-frequency components (edge components) with respect to the horizontal direction of input signal S are removed by the recursive filter. As a result, the low-frequency components of input signal S are output from horizontal recursive filter circuit 201.

In horizontal recursive filter circuit 201 shown in FIG. 8, the control signal output from signal presence detecting circuit 37 is delayed by the amount of time for one-pixel period by one-pixel period delay circuit 36 and then supplied to selector circuit 35. Accordingly, at the time (time t1) when the first video signal that is not of the black level from the start of the horizontal period (the input of the reset signal) is supplied to adder 32, signal presence detecting circuit 37 outputs a control signal of the second level. However, the timing when the control signal of the second level is supplied to selector circuit 35 is one pixel period after time t1. That is, since at time t1 the level of the control signal supplied to selector circuit 35 remains at the first level, selector 35 selects input signal S. In this case, since no removal of high-frequency components by the recursive filter is performed, input signal S is output, as it is, from horizontal recursive filter circuit 201.

At the point of time (time t2) when one pixel period has elapsed from time t1, the level of the control signal input to selector circuit 35 makes a transition from the first level to the second level. Accordingly, at and after time t2, selector 35 selects the output from one-pixel period delay circuit 33, to thereby perform removal of high-frequency components of input signal S with respect to the horizontal direction by means of the recursive filter.

Thereafter, at the timing (the start of the horizontal period) when the reset is input, the level of the control signal output from signal presence detecting circuit 37 makes a transition from the second level to the first level, and the above operation will be repeated.

In this way, according to horizontal recursive filter circuit 201, the recursive filter does not function from the start of the horizontal period up to the point of time when the first video signal, that is not of the black level, is supplied to adder 32, and is caused to provide a recursive filter function for the video signal from then on.

Figure 9:
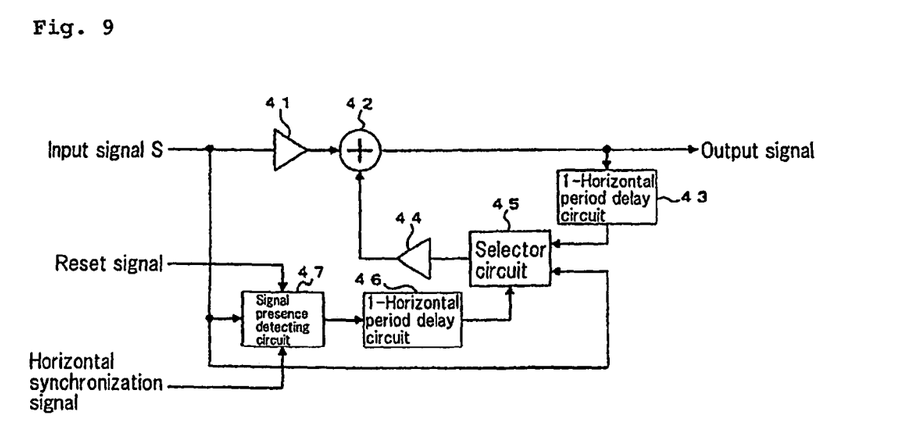
FIG. 9 is a block diagram showing an example of a vertical recursive filter circuit shown in FIG. 7.

Shown in FIG. 9 is a configuration of vertical recursive filter circuit 202. Referring to FIG. 9, vertical recursive filter circuit 202 includes amplifiers 41 and 44, adder 42, one-horizontal period delay circuits 43 and 46, selector circuit 45 and signal presence detecting circuit 47. Input signal S is supplied to one input terminal of selector circuit 45 and is also supplied to the other input terminal of selector 45 by way of amplifier 41, adder 42 and one-horizontal period delay circuit 43. Input signal S is also supplied to signal presence detecting circuit 47.

Amplifier 41 amplifies input signal S. The output from amplifier 41 is supplied to one input terminal of adder 42 and the output from amplifier 44 is supplied to the other input terminal of adder 42. Adder 42 adds the output from amplifier 44 to the output from amplifier 41. Amplifier 44 amplifies the output from selector circuit 45. One-horizontal period delay circuit 43 delays the output from adder 42 by the amount of time corresponding to one-horizontal period. These components, or amplifier 41, adder 42, one-horizontal period delay circuit 43 and amplifier 44 constitute a recursive filter.

In this recursive filter, one-horizontal period delay circuit 43 holds all the video signals in one horizontal period, and adder 42 adds together the video signals, or the input signal supplied from amplifier 41 and the input signal supplied from one-horizontal period delay circuit 43 by way of amplifier 44, both being located at the same horizontal position. As a result it is possible to remove high-frequency components with respect to the vertical direction of input signal S. Here, addition of the video signals located at the same horizontal position means, for example, addition of the video signals, located at the same position on the horizontal line, of the video signal sequence in the n-th horizontal line and of the video signal sequence in the (n+1)-th horizontal line in the displayed image shown in FIG. 4.

Figure 10:
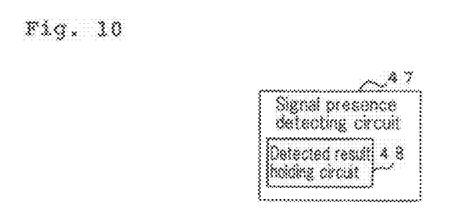
FIG. 10 is a block diagram showing an example of a signal presence detecting circuit shown in FIG. 9.

Signal presence detecting circuit 47 detects, for each row of the signals that are located at the same horizontal position and lined up in the vertical direction (vertically oriented signal line), the timing at which the video signal having other than the black level is input for the first time from the start of the horizontal period. Here, the vertically oriented signal line is, for example a row of signals lined up in the vertical direction of the displayed image shown in FIG. 4. Signal presence detecting circuit 47 includes, as shown in FIG. 10, detected result holding circuit 48. Stored in detected result holding circuit 48 is the result ("signal present" or "no signal present") indicating whether the first video signal other than the black level has been input after input of the blanking signal, for each horizontal position (each vertically oriented signal line). That is, detected result holding circuit 48 has, for every position in the horizontal period, a memory area (memory circuitry) for storing the status information, holds, for each of the vertically lined-up row of signals, the first status information that indicates "no signal present" in the associated memory area, from the start of the vertical period until the first video signal is input, and holds the second status information that indicates "signal present" in the associated memory area when the first video signal input is detected.

The memory areas in detected result holding circuit 48 are all cleared into the reset state (the first status information indicating "no signal present" herein) as a reset signal is input. The reset signal is a signal that regulates the start of the vertical period. Here, the vertical synchronization signal is used as the reset signal. After once holding the second status information, each memory area in detected result holding circuit 48 maintains the second status information until the reset signal is input.

Figure 11:
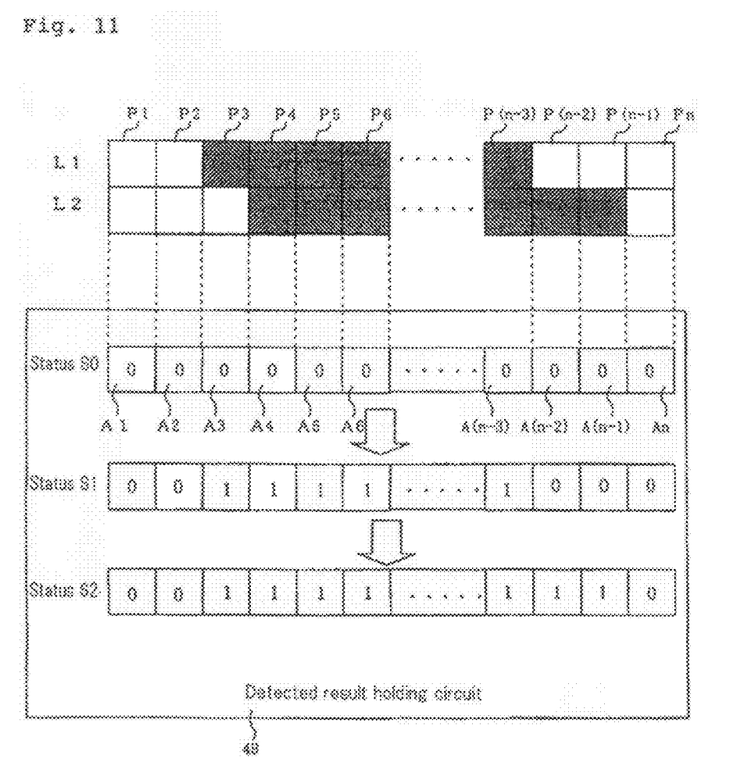
FIG. 11 is a schematic diagram for illustrating the holding operation of status information in a detected result holding circuit shown in FIG. 10.

FIG. 11 schematically shows the operation of holding the status information in detected result holding circuit 48. In FIG. 11, L1 and L2 represent the signal sequences in the first horizontal period (first horizontal line) of the input video signal and in the second horizontal period (second horizontal line), respectively, counted from the vertical synchronization signal. Signal sequences L1 and L2 each consist of signals corresponding to n pixels P1 to Pn. Pixels P1 to Pn correspond to individual horizontal positions on the horizontal line. In signal sequences L1 and L2, the solid white portions represent the blanking signals while the hatched portions represent the video signals with video information.

Detected result holding circuit 48 includes memory areas A1 to An corresponding to pixels Pa to Pn. In the example shown in FIG. 11, at the point of time when the vertical synchronization signal is input, each of memory areas A1 to An is stored with '0' level as the first status information (Status S0).

When signal sequence L1 is input after input of the vertical synchronization signal, the signal status transits from the blanking signal to the video signal at the locations of pixels P3 to P(n−3). As a result, '1' as the second status information is stored into each of memory areas A3 to A(n−3) (Status S1). In this status S1, the signals at the positions of pixels P1, P2 and P(n−2) to Pn continue to be the blanking signal, so that the value '0' that represents the first status information is held at memory areas A1, A2, A(n−2) to An. Here, once the value '1' for the second status information is stored, memory areas A3 to A(n−3) keep up the state written with the value '1' until a reset signal is input.

When signal sequence L2 is input, the signal status transits from blanking signal to the video signal at the locations of pixels P(n−2) and P(n−1). As a result, '1' as the second status information is stored into each of memory areas A(n−2) and A(n−1) (Status S2). In this status S2, the signals at the positions of pixels P1, P2 and to Pn continue to be the blanking signal, so that the value '0' that represents the first status information is held in memory areas A1, A2 and An. Here, once the value '1' for the second status information is stored, memory areas A(n−2) and A(n−1) keep up the state written with the value '1' until a reset signal is input. Accordingly, in Status S2, memory areas A3 to A(n−1) are set to store the value '1' for the second status information.

Signal presence detecting circuit 47 checks whether the input signal at each of the horizontal positions (pixels P1 to Pn) changes from the black level toward white levels for every horizontal period from the start of the vertical period. When the input signal has changed from the black level toward white levels, signal presence detecting circuit 47 checks the status information currently stored in the memory area corresponding to the horizontal position with a change, and outputs a control signal (second level) that indicates the formation of a recursive filter only when the status information is the first status information. Then, signal presence detecting circuit 47 stores the second status information into the memory area corresponding to the horizontal position with a change. Next, the output operation of this control signal will be briefly described with reference to the example shown in FIG. 11.

After input of the vertical synchronization signal, signal sequence L1 is input. In signal sequence L1, the input signals at horizontal positions of pixels P3 to P(n−3) change from the black level toward white levels. Since at this point of time, the value '0' for the first status information is being stored in memory areas A3 to A(n−3), signal presence detecting circuit 47 outputs control signals (second level) that indicate the formation of a recursive filter for the horizontal positions of pixels P3 to P(n−3). Then, the control signals for horizontal positions of pixels P3 to P(n−3) are kept at the second level until a reset signal is input. After input of a reset signal, the control signals for the horizontal positions of pixels P3 to P(n−3) are set to the first level.

After signal sequence L1, signal sequence L2 is input. In signal sequence L2, the input signals at horizontal positions of pixels P(n−1) and P(n−1) change from the black level toward the white levels. Since at this point of time, the value '0' for the first status information is being stored in memory areas A(n−2) and A(n−1), signal presence detecting circuit 47 outputs control signals (second level) that indicate the formation of a recursive filter for the horizontal positions of pixels P(n−2) and P(n−1). Then, the control signals for horizontal positions of pixels P(n−2) and P(n−1) are kept at the second level until a reset signal is input. After input of a reset signal, the control signals for the horizontal positions of pixels P(n−2) and P(n−1) are set to the first level.

According to the above output operation of the control signals, the control signal changes from the first level to the second level at the timing when the video signal other than the black level is input for the first time from the start of the vertical period for every vertically oriented signal line. For each vertically oriented signal line, during the period in which the control signal remains at the first level, selector 45 outputs the input signal that is supplied to one input terminal thereof, as it is, to amplifier 34. Accordingly, no removal of high-frequency components by any recursive filter is performed. As a result, input signal S is output as it is from the vertical recursive filter circuit. On the other hand, for each vertically oriented signal line, during the period in which the control is set at the second level, selector 45 supplies the output from unit delay circuit 43 to amplifier 44, so that removal of high-frequency components of the input signal S along each vertically oriented signal line is performed by recursive filtration. As a result, the output from vertical recursive filter circuit 202 only shows the low-frequency components of each vertically oriented signal line.

The control signal from signal presence detecting circuit 47 is delayed by one horizontal period by one-horizontal period delay circuit 46 and then supplied to selector 45. In the recursive filter constituted of amplifier 41, adder 42, one-horizontal period delay circuit 43 and amplifier 44, the output from adder 42 is delayed by one-horizontal period by one-horizontal period delay circuit 43 and then supplied to selector 45 in the feedback line. That is, in the recursive filter, adder 42 adds, for each vertically directional signal line, the input signal that is supplied through the feedback line to the input signal that is supplied one-horizontal period later than the former input signal. According to this arrangement, for each vertically oriented signal line the recursive filter does not function from the start of the horizontal period up to the point of time when the first video signal, that is not of the black level, is supplied to adder 42, and is caused to provide a recursive filter function for the video signal from then on. Accordingly, in vertical recursive filter circuit 202, for each vertically oriented signal line, the recursive filter does not function from the start of the vertical period until the lapse of one-horizontal period after the first video signal, that is not of the black level, was input, so the input signal is output as it is. Since the recursive filter functions after the lapse of one-horizontal period, only the low-frequency components of the input signal are output from vertical recursive filter circuit 202.

When 2-dimensional LPF circuit 2 shown in FIG. 5 is constructed using the above-described horizontal recursive filter circuit 201 and vertical recursive filter circuit 202, it is possible to realize the operation as follows. Here, in the image quality improving apparatus of the present exemplary embodiment, 2-dimensional LPF circuit 2 has been described referring to a configuration that enables the field inversion process as shown in FIG. 6, however, it is possible to provide a configuration in which removal of high-frequency components (edge components) from the input video signal with respect to both the horizontal and vertical directions is performed without use of a field inversion process. The following operation is a case when such 2-dimensional LPF circuit 2 is used.

In flare correction (flare correction with respect to the horizontal direction) using horizontal recursive filter circuit 201, when, for example the video signal that has been subjected to a geometric distortion correction shown in FIG. 4 is input, the flare correction has no effect on the edge (edge E1 in this case because this is a horizontal process) where the input video signal changes from the blanking signal (black level) to the video signal, and the flare correction becomes valid only after it enters video signal area S1. In this way, no unnecessary flare correction is effected inside video signal area S1, so that it is possible to realize correct flare correction in video signal area S1.

It should be noted that flare correction is effected on the edges (edges E2, E3 and E4 in this case because this is a horizontal process) where the video signal changes from video signal area S1 to blanking area S2 again. However, in terms of the properties of a recursive filter, flare correction at edges E2, E3 and E4 will have no effect on the signals before these edges (the areas along the edges and inside video signal area S1). That is, flare correction at edges E2, E3 and E4 has effects on the area along the edge and inside blanking area S2 only. Since this effect of flare correction on the area along the edge inside blanking area S2 brings about an action to make the black level signal in blanking area S2 further black (make the signal level take a negative value), this will not affect the quality of the video signal. Usually, if the signal level has a negative value, the signal is clipped at 0.

In the flare correction (flare correction with respect to the vertical direction) using vertical recursive filter circuit 202, when, for example the video signal that has been subjected to a geometric distortion correction shown in FIG. 4 is input, the flare correction has no effect on the edges (edges E1, E2 and E3 in this case because this is a vertical process) where the video signal changes from the blanking signal (black level signal) area to video signal area S1, and the flare correction becomes valid only after it enters video signal area S1. In this way, no unnecessary flare correction is effected in video signal area S1, so that it is possible to realize correct flare correction in video signal area S1.

It should be noted that flare correction is made to the edge (edge E4 in this case because this is a vertical process) where the video signal changes from video signal area S1 to blanking area S2 again. In terms of the properties of the recursive filter, however, flare correction at edge E4 will have no effect on the signal before the edge (the area along the edge and inside video signal area S1). That is, this flare correction at edge E4 has effects on the area along the edge and inside blanking area S2 only. Since this effect of flare correction on the area along the edge inside blanking area S2 brings about an action to make the black level signal in blanking area S2 further black (make the signal level take a negative value), this will not affect the quality of the video signal. Usually, if the signal level has a negative value, the signal is clipped at 0.

Next, description will be made on the operation when recursive filter circuits 21 and 23 shown in FIG. 6 are constructed using horizontal recursive filter circuit 201 and vertical recursive filter circuit 202.

Flare correction in the horizontal and vertical directions by recursive filter circuit 21 is performed as described above. After time axis inversion by time axis inverting circuit 22, the signals are supplied to recursive filter circuit 23 in the reverse order in which the input signals were supplied to recursive filter circuit 21 for both the horizontal and vertical directions. Specifically, in the video signals shown in FIG. 4, the signals are input sequentially to recursive filter circuit 21 horizontally in the order from the upper left to the lower right in the drawing, whereas the signal is sequentially input to recursive filter circuit 23 in the order from the lower right to the upper left in the drawing. Accordingly, in recursive filter circuit 21, flare correction to the displayed image shown in FIG. 4 is effected in the horizontal direction from left to right and in the vertical direction from top to bottom. On the other hand, in recursive filter circuit 23, flare correction to the displayed image shown in FIG. 4 is effected in the horizontal direction from right to left and in the vertical direction from bottom to top.

Also in the case of the flare correction involving recursive filter circuit 23, similarly to the case of the flare correction involving recursive filter circuit 21, for the horizontal direction, the flare correction has no effect on the edges (edges E2, E3 and E4 in this case because the time axis is inverted) where the video signal changes from the blanking signal (black level signal) to the video signal. In the vertical direction, the flare correction has no effect on the edge (edge E4 in this case because the time axis is inverted) where the video signal changes from the blanking signal (black level signal) to the video signal. In this way, no unnecessary flare correction is effected in video signal area S1, so that it is possible to realize correct flare correction in video signal area S1.

Here, also in recursive filter circuit 23 flare correction is carried out to the edges (E1 when in the horizontal direction and E1, E2 and E3 when in the vertical direction) where the video signal changes from video signal area S1 to blanking area S2 again. However, in terms of the properties of a recursive filter, flare correction at the edge will have no effect on the signal before the edge (the area along the edge and inside video signal area S1). That is, flare correction at the edge has an effect on the area along the edge and inside blanking area S2 only. Since this effect of flare correction on the area along the edge and inside blanking area S2 brings about an action to make the black level signal in blanking area S2 further black (make the signal level take a negative value), this will not affect the quality of the video signal. Usually, if the signal level has a negative value, the signal is clipped at 0.

As has been described heretofore, according to the image quality improving apparatus of the present exemplary embodiment, since it is possible to suppress unnecessary flare correction at the boundaries (edges) between the blanking area and the video signal area for the video signal that has been modified by geometric distortion correction, it is hence possible to produce high quality images.

The image quality improving apparatus of the present invention can be applied to an image display device represented by a projector or the like, in particular to an image display device in which the video signal is subjected to a geometric distortion correction.

With respect to the image quality improving apparatus and method of the present invention, there are the following exemplary aspects which include components for providing high-quality video by suppressing unnecessary flare correction at the boundary between the blanking area and video signal area.

A image quality improving apparatus according to an exemplary aspect of the present invention includes: a low-pass filter circuit for extracting low-frequency components from an input video signal; a subtractor circuit for subtracting the low-frequency components extracted by the low-pass filter circuit from the input video signal to obtain high-frequency components; and an adder circuit for adding the high-frequency components obtained by the subtractor circuit as a correcting signal to the input video signal, wherein the input video signal includes blanking signals that do not contain any video information; and the low-pass filter circuit starts extracting the low-frequency components after a lapse of a predetermined unit time from when the input video signal changed from the blanking signal to the signal containing the video information.

An image quality improving method according to an exemplary aspect of the present invention includes: extracting low-frequency components from an input video signal; obtaining high-frequency components by subtracting the low-frequency components extracted at said first step from said input video signal; and adding the high-frequency components obtained at said second step as a correcting signal to said input video signal, and wherein said input video signal contains blanking signals without any video information, and extraction of said low-frequency components is started after a lapse of a predetermined unit time from when said input video signal changed from said blanking signal to the signal containing said video information.

According to the exemplary aspects described above, the low-pass filter circuit starts extracting low-frequency components for the first time after a lapse of the predetermined unit time from timing T at which the input video signal changes from the blanking signal to the signal containing video information. This operation will be specifically described hereinbelow, taking an example of the displayed image shown in FIG. 4.

When the low-frequency components along the horizontal direction are extracted, the edge at timing T corresponds to edge E1. The low-pass filter circuit starts extracting low-frequency components in the horizontal period (horizontal line) after a lapse of the predetermined unit time from edge E1. Here, when the unit time is set to be one pixel period (the display period of one pixel that constitutes the displayed image), extraction of low-frequency components along the horizontal direction is started after a lapse of one-pixel period from edge E1. In this case, flare correction has no effect on edge E1 and starts to bring about effects on the signal after a lapse of one-pixel period from edge E1. That is, flare correction starts functioning after it has entered video signal area S1.

When low-frequency components along the vertical direction are extracted, one horizontal duration is taken as the unit time and the edge at timing T corresponds to edge E3. The low-pass filter circuit starts extracting low-frequency components in each vertically oriented signal line at the same horizontal position, after a lapse of the predetermined unit time (one-horizontal period) from edge E3. In this case, flare correction has no effect on edge E3 in the vertical signal line and starts to bring about an effect on the signal after a lapse of one-horizontal period from edge E3. That is, flare correction starts functioning after it has entered video signal area S1.

As a result, according to the present invention, it is possible to suppress unnecessary flare correction at the boundary (edge) between the blanking area and the video signal area, it is hence possible to provide high quality images compared to the aforementioned image quality improving apparatuses described as the related art.

This application is based upon and claims the benefit of priority from Japanese Patent Application No. 2007-16382 filed in Japan Patent Office on Jan. 26, 2007, the contents of which are hereby incorporated by reference.

While exemplary embodiments of the present invention have been described using specific terms, such description is for illustrates purposes only, and it is to be understood that changes and variations may be made without departing from the spirit or scope of the following claims.

The invention claimed is:

1. An image quality improving apparatus, comprising:
   a low-pass filter circuit that extracts low-frequency components from an input video signal;
   a subtractor circuit that subtracts the low-frequency components extracted by said low-pass filter circuit from said input video signal to obtain high-frequency components; and an adder circuit that adds the high-frequency components obtained by said subtractor circuit as a correcting signal to said input video signal, wherein said input video signal includes blanking signals that do not contain any video information, wherein said low-pass filter circuit starts extracting the low-frequency components after a lapse of a predetermined unit time from when said input video signal is changed from said blanking signal to the signal containing said video information, and wherein said low-pass filter circuit comprises:
a vertical recursive filter circuit which, based on a vertical synchronization signal that regulates a vertical period as a display period of a field or a frame of an image to be displayed in accordance with said input video signal and based on a horizontal synchronization signal that regulates a horizontal period as a display period of each of multiple horizontal lines that form said image, extracts the low-frequency components.

2. The image quality improving apparatus according to claim 1, wherein said low-pass filter circuit includes:
a recursive filter that extracts the lower-frequency components of said input video signal by adding said input video signal to a delayed signal that is obtained by delaying the input video signal by said unit time; and
a control circuit that detects a timing at which said input video signal changes from said blanking signal to the signal containing said video information and that causes said recursive filter to operate after a lapse of said unit time from the detected timing.

3. The image quality improving apparatus according to claim 1, wherein said
vertical recursive filter circuit extracts the low-frequency components of said input video signal with respect to a vertical direction for every said vertical period,
wherein said low-pass filter circuit comprises a horizontal recursive filter circuit which, based on said horizontal synchronization signal, extracts the low-frequency components of said input video signal with respect to a horizontal direction for every said horizontal period,
wherein said horizontal recursive filter circuit, in said horizontal period, detects a timing at which a horizontal signal sequence input in the horizontal period is changed from said blanking signal to the signal containing said video information, and starts extracting the low-frequency components of the horizontal signal sequence after a first unit time that is equal to a unit display period for one pixel constituting said image has elapsed from the detected timing, and
wherein said vertical recursive filter circuit, in said vertical period, detects for each line of signals, on said multiple lines, which are lined up vertically at a same position with respect to the horizontal direction, a timing at which said vertically oriented signal line changes from said blanking signal to the signal containing said video information, and starts extracting the low-frequency components of said vertically oriented signal line after the second unit time that corresponds to said horizontal period has elapsed from the detected timing.

4. The image quality improving apparatus according to claim 1, wherein said low-pass filter circuit includes:
a first recursive filter circuit that extracts the low-frequency components of said input video signal;
a first frame inverter that inverts a time axis of the video signal from which the low-frequency components were extracted by said first recursive filter circuit;
a second recursive filter circuit that extracts the low-frequency components of a video signal whose time axis was inverted by said first frame inverter; and
a second frame inverter for inverting the time axis of the video signal from which the low-frequency components were extracted by said second recursive filter circuit,
wherein each of said first and second recursive filter circuits includes:
the vertical recursive filter circuit which extracts the low-frequency components of said input video signal with respect to a vertical direction for every said vertical period; and
a horizontal recursive filter circuit which, based on said horizontal synchronization signal, extracts the low-frequency components of said input video signal with respect to a horizontal direction for every said horizontal period,
wherein said horizontal recursive filter circuit, in said horizontal period, detects a timing at which a horizontal signal sequence input in the horizontal period changed from said blanking signal to the signal containing said video information, and starts extracting the low-frequency components of the horizontal signal sequence after a first unit time that is equal to a unit display period for one pixel constituting said image has elapsed from the detected timing, and
wherein said vertical recursive filter circuit, in said vertical period, detects for each line of signals, on said multiple lines, which are lined up vertically at a same position with respect to the horizontal direction, a timing at which said vertically oriented signal line changes from said blanking signal to the signal containing said video information, and starts extracting the low-frequency components of said vertically oriented signal line after the second unit time that corresponds to said horizontal period has elapsed from the detected timing.

5. The image quality improving apparatus according to claim 3, wherein said horizontal recursive filter circuit includes:
an adder which comprises one input terminal to which an input signal is supplied and another input terminal to which an output from said adder is supplied by a way of a feedback line, said adder adding the signal supplied to said another input terminal to the input signal supplied to said input terminal;
a first delay circuit which is disposed on said feedback line and that delays the output from said adder by said first unit time;
a selector circuit that receives said input signal as a first input and the output from said first delay circuit as a second input, and selects one of the inputs to supply it to said another input terminal of said adder;
a signal presence detecting circuit that receives said input signal, detects, for every said horizontal period, a timing at which the received signal changes from said blanking signal to the signal containing said video information and outputs a control signal that indicates a formation of a recursive filter at the detected timing; and
a second delay circuit that delays the control signal output from said signal presence detecting circuit by said first unit time, and
wherein said selector circuit is supplied with the control signal output from said signal presence detecting circuit by a way of said second delay circuit, selects, in said horizontal period, said first input from a start of the horizontal period until said control signal is received, and selects said second input after reception of said control signal.

6. The image quality improving apparatus according to claim 4, wherein said horizontal recursive filter circuit includes:
an adder which comprises one input terminal to which an input signal is supplied and another input terminal to which an output from said adder is supplied by a way of a feedback line, said adder adding the signal supplied to said another input terminal to the input signal supplied to said input terminal;
a first delay circuit which is disposed on said feedback line and that delays the output from said adder by said first unit time;
a selector circuit that receives said input signal as a first input and the output from said first delay circuit as a second input, and selects one of the inputs to supply it to said another input terminal of said adder;
a signal presence detecting circuit that receives said input signal, detects, for every said horizontal period, a timing at which the received signal changes from said blanking signal to the signal containing said video information and outputs a control signal that indicates a formation of a recursive filter at the detected timing; and
a second delay circuit that delays the control signal output from said signal presence detecting circuit by said first unit time, and
wherein said selector circuit is supplied with the control signal output from said signal presence detecting circuit by a way of said second delay circuit, selects, in said horizontal period, said first input from a start of the horizontal period until said control signal is received, and selects said second input after reception of said control signal.

7. The image quality improving apparatus according to claim 3, wherein said vertical recursive filter circuit includes:
an adder which comprises one input terminal to which an input signal is supplied and another input terminal to which an output from said adder is supplied by a way of a feedback line, said adder adding the signal supplied to said another input terminal to the input signal supplied to said input terminal;
a first delay circuit that is disposed on said feedback line, receives the output from said adder, and holds, for every said horizontal period, a horizontal sequence of signals that are input during said horizontal period for said second unit time;
a selector circuit that receives said input signal as a first input and the output from said first delay circuit as a second input, and selects one of the inputs to supply it to said another input terminal of said adder;
a signal presence detecting circuit that receives said input signal, detects, for each vertical sequence of signals that are input during said vertical period, a timing at which the vertical sequence of signals changed from said blanking signal to the signal containing said video information and outputs a control signal that indicates a formation of a recursive filter for the vertical sequence at the detected timing; and
a second delay circuit that delays the control signal for each vertical sequence of signals output from said signal presence detecting circuit by said second unit time, and
wherein said selector circuit, to which said control signal for each vertical sequence output from said signal presence detecting circuit is supplied by a way of said second delay circuit, selects, in said vertical period, said first input for each vertical sequence of signals, from a start of the vertical period until said associated control signal is received and selects said second input after reception of said control signal.

8. The image quality improving apparatus according to claim 4, wherein said vertical recursive filter circuit includes:
an adder which comprises one input terminal to which an input signal is supplied and another input terminal to which an output from said adder is supplied by a way of a feedback line, said adder adding the signal supplied to said another input terminal to the input signal supplied to said input terminal;
a first delay circuit that is disposed on said feedback line, receives the output from said adder, and holds, for every said horizontal period, a horizontal sequence of signals that are input during said horizontal period for said second unit time;
a selector circuit that receives said input signal as a first input and the output from said first delay circuit as a second input, and selects one of the inputs to supply it to said another input terminal of said adder;
a signal presence detecting circuit that receives said input signal, detects, for each vertical sequence of signals that are input during said vertical period, a timing at which the vertical sequence of signals changed from said blanking signal to the signal containing said video information and outputs a control signal that indicates a formation of a recursive filter for the vertical sequence at the detected timing; and
a second delay circuit that delays the control signal for each vertical sequence of signals output from said signal presence detecting circuit by said second unit time, and
wherein said selector circuit, to which said control signal for each vertical sequence output from said signal presence detecting circuit is supplied by a way of said second delay circuit, selects, in said vertical period, said first input for each vertical sequence of signals, from a start of the vertical period until said associated control signal is received and selects said second input after reception of said control signal.

9. An image quality improving method, comprising:
extracting low-frequency components from an input video signal;
obtaining high-frequency components by subtracting the low-frequency components extracted at said extracting low-frequency from said input video signal; and
adding the high-frequency components obtained at said obtaining high-frequency components as a correcting signal to said input video signal,
wherein said input video signal contains blanking signals without any video information, and extraction of the low-frequency components is started after a lapse of a predetermined unit time from when said input video signal is changed from said blanking signal to the signal with said video information, and
wherein said extracting the low-frequency components comprises:
extracting, in a vertical recursive filter circuit, the low-frequency components based on a vertical synchronization signal that regulates a vertical period as a display period of a field or a frame of an image to be displayed in accordance with said input video signal and based on a horizontal synchronization signal that regulates a horizontal period as a display period of each of multiple horizontal lines that form said image.

10. The image quality improving apparatus according to claim 1, wherein said low-pass filter circuit detects a timing at which said input video signal is changed from said blanking signal to the signal containing said video information.

11. The image quality improving apparatus according to claim 10, wherein said low-pass filter circuit starts extracting the low-frequency components after a lapse of said unit time from the detected timing.

12. The image quality improving apparatus according to claim 1, wherein said
vertical recursive filter circuit extracts the low-frequency components of said input video signal with respect to a vertical direction for every said vertical period.

13. The image quality improving apparatus according to claim 12, wherein said low-pass filter circuit further comprises:
a horizontal recursive filter circuit which, based on said horizontal synchronization signal, extracts the low-frequency components of said input video signal with respect to a horizontal direction for every said horizontal period.

14. The image quality improving apparatus according to claim 13, wherein said horizontal recursive filter circuit, in said horizontal period, detects a timing at which a horizontal signal sequence input in the horizontal period is changed from said blanking signal to the signal containing said video information, and starts extracting the low-frequency components of the horizontal signal sequence after a first unit time that is equal to a unit display period for one pixel constituting said image has elapsed from the detected timing.

* * * * *